Feb. 27, 1968   W. B. WILKINS ET AL   3,370,734
PALLET CONTAINER

Filed Oct. 20, 1965   4 Sheets-Sheet 1

INVENTORS
WILLIAM B. WILKINS
DAVID J. WYROUGH
BY
*Henry Kozak*
ATTORNEY

Feb. 27, 1968  W. B. WILKINS ET AL  3,370,734
PALLET CONTAINER
Filed Oct. 20, 1965  4 Sheets-Sheet 2
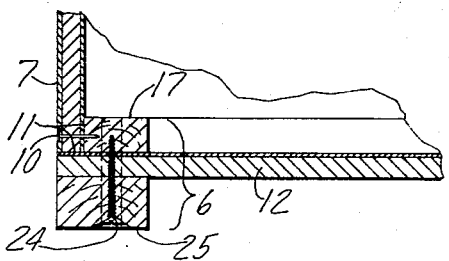
Fig.4
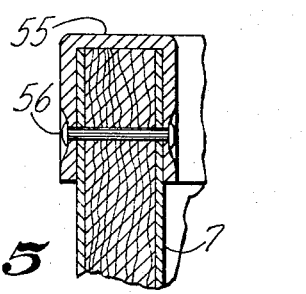
Fig.5
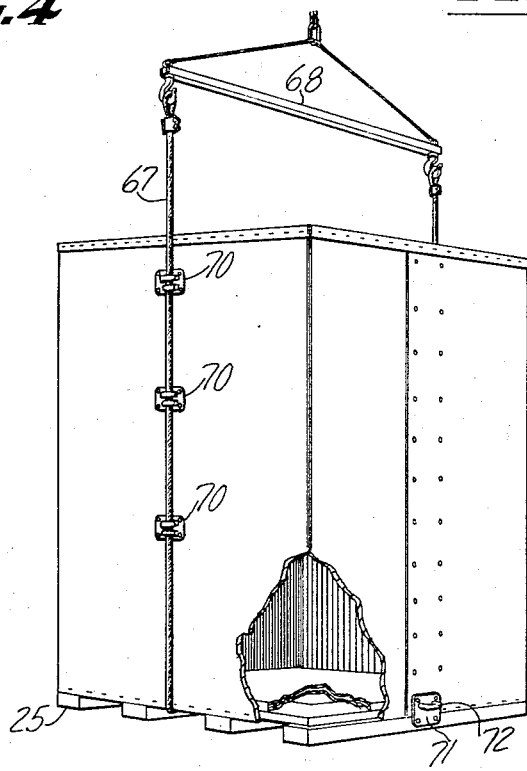
Fig.6
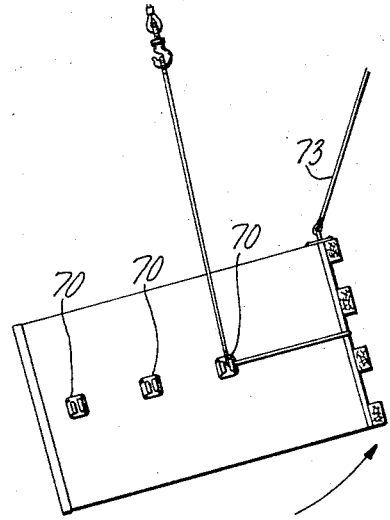
Fig.8
Fig.7
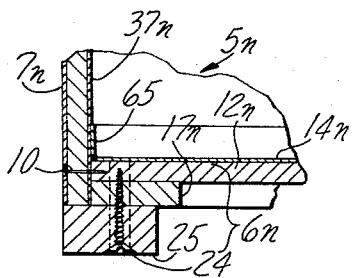
Fig.9
INVENTORS
WILLIAM B. WILKINS
DAVID J. WYROUGH
BY
Henry Kozak
ATTORNEY

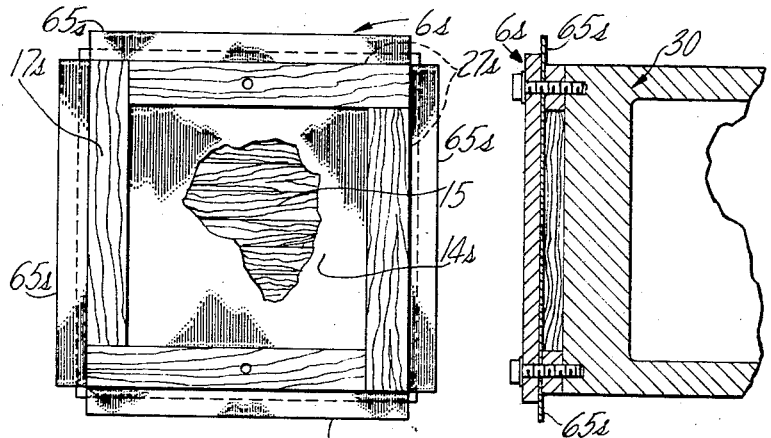
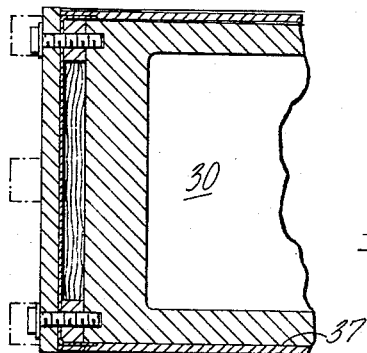
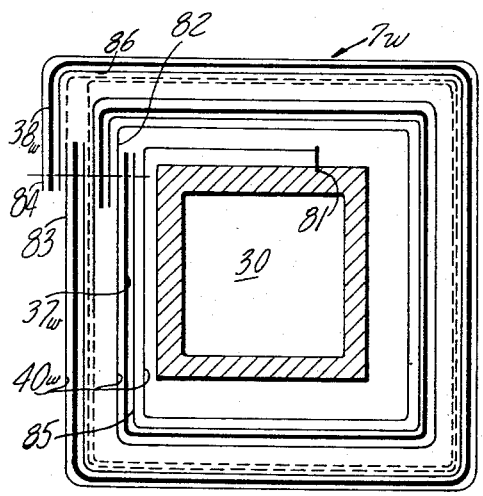
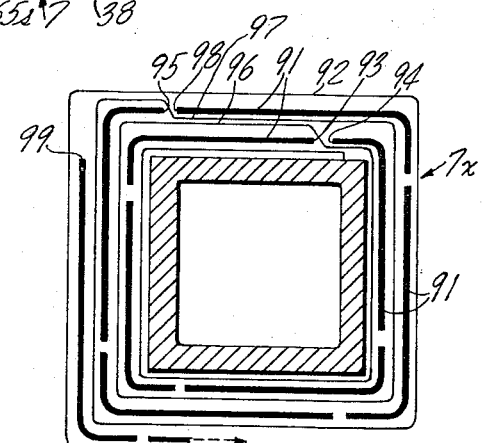
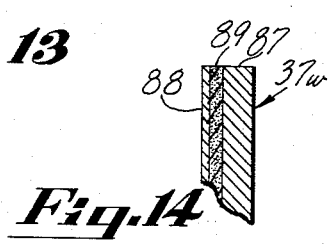

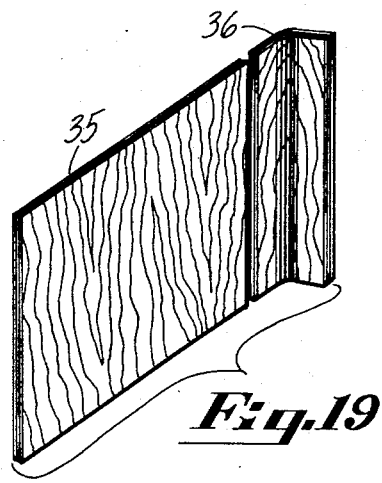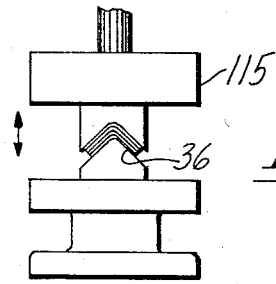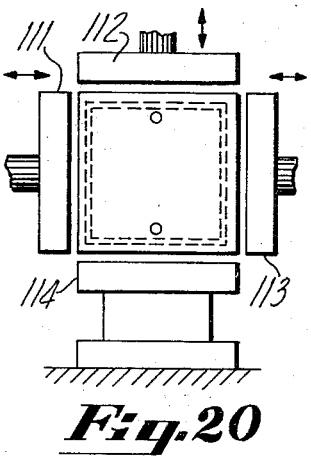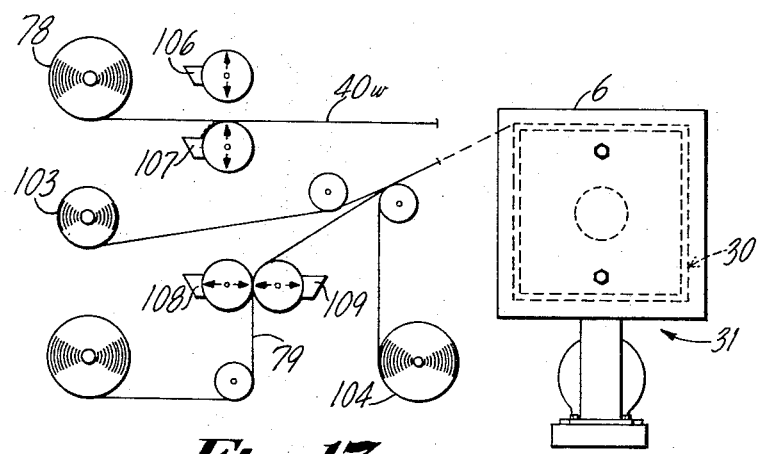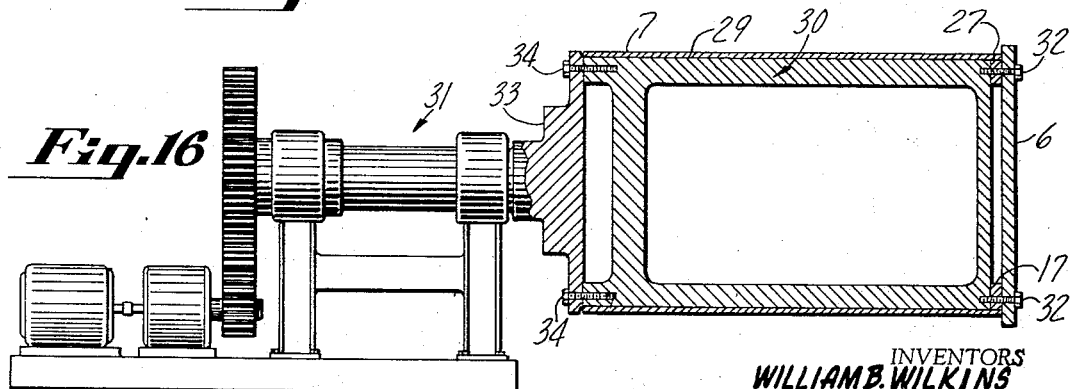

United States Patent Office 3,370,734
Patented Feb. 27, 1968

3,370,734
PALLET CONTAINER
William Burdette Wilkins and David J. Wyrough, Roxboro, N.C., assignors to Midland-Ross Corporation, Cleveland, Ohio, a corporation of Ohio
Filed Oct. 20, 1965, Ser. No. 498,380
15 Claims. (Cl. 217—5)

ABSTRACT OF THE DISCLOSURE

A heavy-duty container having a side wall and a base united and arranged to provide rigid and integrated structure adapting the container for handling by fork-lift truck and crane. The components of the container are selected and arranged to facilitate the manufacturing thereof by assembly on a wrapping mandrel.

Description

Containers constructed according to this invention are designed for receiving high density material, such as ore, castings, small forgings, machine shop work, and other lading of high weight-to-volume ratio. This invention is particularly concerned with an advantageous arrangement of the components.

In a great many factories, warehouses, shipping terminals, and other industrial facilities, a practical mode of material handling is attained through the provision of smooth floors, lift trucks, pallets and/or containers of various types. Typical pallets or containers have base dimensions exemplified by the standard four feet by six feet stevedore pallet, or a box-like container used in the small forgings or castings industries having a base, e.g., two and a half feet by three feet. The load capacities of such pallets or containers vary up to a couple of tons or more, and the cubic capacity of the containers may vary in the order of 10 to 150 cubic feet, depending upon the industry and the goods to be handled.

An important object of this invention is to provide an open top container of composite construction providing very high strength and serviceability in relation to its weight.

Another object is to provide the container of the foregoing object in the form of what is known herein as a "pallet box" characterized by an upper container portion and a base portion adapted for receiving a lifting device thereunder.

It is a further object to provide the pallet boxes or containers of the foregoing objects adapted for being lifted by a crane and tilted bottom-up to effect discharge of the contents thereof.

A more specific object is to utilize adhesives in such a manner as to produce containers having metal-clad side walls with the metallic surfaces along the inner and outer peripheries of the side wall exposed.

Briefly speaking, these and other objects are accomplished in the construction of a container having a side wall and a base comprising the floor of the container wherein the side wall has skin structure comprising an outer skin and an inner skin and core structure therebetween, and the base comprises a frame member and a floor member secured together of which one member fits just inside the end of the side wall on the inner periphery thereof and the other member fits outside the side wall against the entire end surface thereof. The side wall comprises a sheet material forming the skins and a sheet material forming the core of which one is a continuous sheet extending through a series of wraps from the inner skin to the outer skin. The other material is distributed along the length of the sheet but of less length.

In one embodiment, a skin material such as metal sheet extends as one wrap forming the inner skin, then transversely through one wrap of core material, and then through at least one outer wrap to form the outer skin. The core material, preferably of wood or other low density fibrous non-metallic material, may consist of one or more wraps, each wrap having a leading end and a trailing end spaced to form a small gap through which the skin-forming material extends. Suitable adhesive material joins all interfaces of the skin and core materials.

In another embodiment, the continuous sheet of a side wall comprises the core material and extends initially from the inner surface of the side wall with the inner skin disposed as at least one complete wrap between adjacent inner wraps of the core material, the core section comprising a plurality of wraps of the core material, and the outer skin comprising at least a full wrap of the skin material disposed between outer wraps of the core material. Wraps of the sheet of core material exteriorly of the outer skin and interiorly of the inner skin are not adhered to respective adjacent skins so as to permit removal of those portions and exposure of the skins.

In furtherance of the objects, construction of the container as defined above is carried out by providing a wrapping mandrel conforming to a desired shape of the inner surface of the side wall, assembling the base and attaching it with one member thereof normally disposed inside the end of the side wall and attached to the end surface of the mandrel in flush relation with its periphery; wrapping the continuous sheet of the core or skin material, as the case may be, over the mandrel and the base member juxtaposed therewith the wrapping being continued to include the other material for a desired disposition thereof within the wraps of the continuous sheet; applying an adhesive to all interfaces of the materials; securing that portion of the resulting side wall to the base member wrapped to the side wall by fastening means extending entirely through the side wall into the base member; and detaching the base from the mandrel and removing the container from the mandrel.

In the drawing with respect to which the invention is described below:

FIG. 4 is a fragmentary elevation in section of a lower corner portion of the container shown in FIG. 1.

FIG. 5 is a fragmentary elevation in section of a top edge portion of the side wall of the container of FIG. 1.

FIG. 6 is a perspective view of a modified pallet container showing a corner section broken away to expose the construction.

FIG. 7 is a side elevation of the container of FIG. 6 in an unloading position.

FIG. 8 is a fragmentary perspective view of a side wall portion of the container of FIG. 5 especially illustrating a cable-receiving fixture attached to the side wall.

FIG. 9 is a fragmentary elevation in section showing the relationship of the side wall and base component of the container of FIG. 6.

FIG. 10 is a plan view with a sheet portion broken away of a modified base shown also in FIGS. 11 and 12.

FIG. 11 is a longitudinal cross section of a container-wrapping mandrel and the base of FIG. 10 attached thereto.

FIG. 12 is a longitudinal cross section of the mandrel and base of FIG. 11 illustrating tab portions of the base incorporation into the container side wall.

FIGS. 13 and 15 are schematic end views of modified side walls with the elements thereof shown expanded and separated to illustrate the arrangement thereof.

FIG. 14 is a fragmentary transverse section of a skin component of the wall illustrated in FIG. 13.

FIGS. 16 and 17 are schematic elevations, FIG. 16 being in partial cross section, illustrating apparatus used to carry out a wrapping step entailed in the manufacture of containers according to this invention.

FIG. 18 is a schematic view of a shaping and curing press and a side wall corner component contained therein.

FIG. 19 is a perspective view of side wall components including the one positioned in the press of FIG. 18.

FIG. 20 is a schematic elevation of an apparatus for subjecting a side wall to a curing operation.

FIGS. 1 to 5 illustrate one embodiment of the invention, i.e., a pallet box or container 5 shown in toto in FIG. 1.

Figure 2:
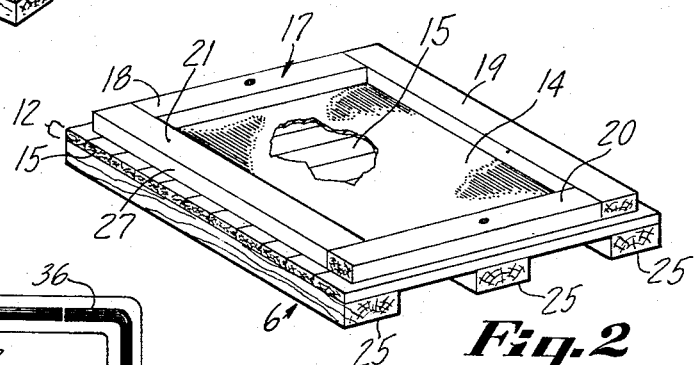
FIG. 2 is a perspective view of the container base of FIG. 1 with a floor sheet element broken away to expose an underlying component.
Figure 3:
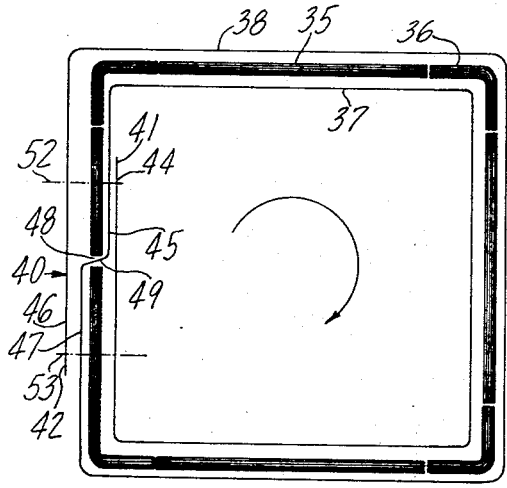
FIG. 3 is a schematic end view of a side wall such as used in the container of FIGS. 1 and 2 with the elements thereof separated and expanded to illustrate the arrangement thereof.

FIGS. 2 and 3 illustrate a base 6 and a side wall 7, respectively, which are joined as shown in FIG. 4 by fastening means such as a plurality of staples 10 and an adhesive disposed along the interface of the base and the side wall at 11.

The base 6, as shown in FIG. 2, comprises a floor member 12 having an upper metal lamina 14 and a wooden plate 15. The base further includes a frame 17 comprising, as shown, frame pieces 18, 19, 20, and 21 secured to the upper side of a floor member against the metal plate 14. Such attachment may be effected as shown in FIG. 4 by a plurality of screws 24 which extend through stringers 25 secured to the undersurface of the floor member. The stringers have the function of reinforcing the base 6, especially if the floor plate 15 consists of boards as shown, and also to space the floor member 12 above any support surface so that lifting means, such as the fork of a fork-lift truck or cables of a cable-hoist may be inserted under the floor member.

The frame 17 has an outer periphery 27 conforming to the inner periphery of the side wall 7. This outer periphery of the frame also conforms to the outer periphery 29 of a mandrel 30 of a wrapping machine 31 shown in FIG. 16. In this figure, the base 6 with the stringers 25 removed is shown attached to an end surface of the mandrel with the outer periphery of the frame 17 in flush relation with the outer periphery of the mandrel and the inner periphery of the side wall 7. The base 6 is secured to the mandrel by means such as bolts 32. The mandrel is shown as detachable from a rotor or spindle 33 to which the mandrel is secured by bolts 34. This arrangement enables the mandrel 30 and the portions of the container 5 attached thereto to be removed in assembled condition and placed, for example, in the apparatus of FIG. 18 for a curing treatment involving heating and pressure.

FIG. 3 is in the nature of a schematic cross section or end view showing components of the side wall normally joined together by an adhesive in separated condition in order to more clearly understand the structure of the side wall in its fully manufactured condition.

FIGS. 3 and 15 illustrate details of core structure, which, in a preferred form of the invention, occurs as a plurality of pre-shaped plywood panels 35 and plywood angles 36.

In the wrapping procedure described below, the plywood pieces 35 and 36 are disposed somewhat as shown in FIG. 3 to form core structure, between an inner metal sheet skin 37 and an outer metal skin 38. In the embodiment presently described, the inner and outer skins of the wall are formed by one continuous sheet 40 having its leading end at 41 and its trailing end at 42. This sheet is wound in such a manner as to form overlapping portions 44 and 45 of the inner skin and overlapping portions 46 and 47 of the outer skin. The core material assembles into a substantially continuous wrap, except for a gap at 48 through which extends portion 49 of the sheet 40, joining the inner skin with the outer skin.

Although inexpensive adhesives, such as the urea formaldehyde and phenol formaldehyde resins are used as the agent for bonding the constituent plies of the panels 35 and angles 36 together, an adhesive, such as epoxy resin, having good tenacity with metal is preferred for joining the interfaces of the angles and panels with both the inner and outer skins. In the finished wall, the components of the side wall 7 are compactly joined together, as shown in FIG. 4. Epoxy resin, or other good metal-to-metal adhesive joins all metal-to-metal surfaces, such as the overlapping portions of the inner skins and outer skins mentioned above.

Figure 1:
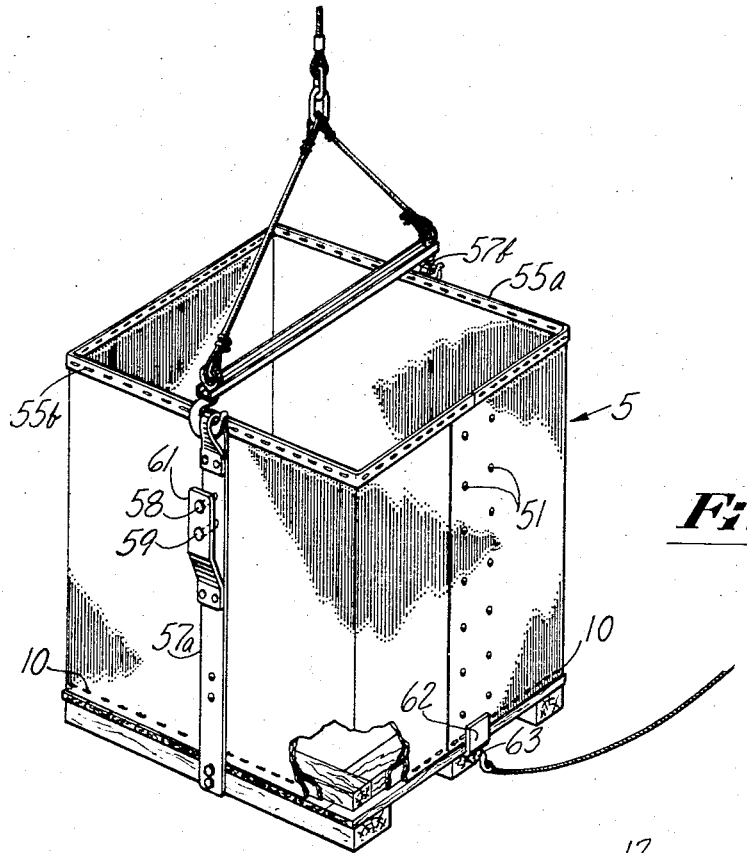
FIG. 1 is a perspective view of a container constructed in accordance with the invention shown suspended by cable and with a corner broken away to show the construction of its base.

Preferably, the rivets 51 (see FIG. 1) extend through the side wall, e.g., approximately along lines 52 and 53 of FIG. 3 to secure the termini of the sheet 40 in case of failure of the adhesive, and to better prepare the container for the rough treatment to which a container of this type is subjected. Other features of construction of the container 5 shown in FIG. 5 preferably includes a preshaped channel 55 of wear-resistant material, such as metal or reinforced plastic, stapled to the upper edge of the wall 7 by staples 56. As shown in FIG. 1, the channel 55 is provided in two preshaped halves 55a and 55b.

Another optional feature of the container 5 resides in the metal strips 57a and 57b riveted to opposite sides of the container. Each strip comprises an upper loop or eye portion suitable for connecting with lifting apparatus, such as a hoist hook, so that the container may be handled easier during dumping operations. Additional hook receptacles are provided at intermediate heights along the strips 57a and 57b formed by pins, such as 58 and 59 anchored as shown with respect to strip 57a, in both strips and supported outboardly of the respective adjacent strip by another strip 61 in spaced relationship except for its bottom portion which is shown joined by rivets to the base strip 57a and the adjacent container side. To facilitate the dumping of the container, a bracket 62 providing a hook-receiving loop 63 is attached to a bottom dihedral corner of the container running transversely of the sides to which the strips 57a and 57b are attached.

FIGS. 6, 7, 8, and 9 illustrate a modified container also equipped for unloading by "up-turning." As shown by FIG. 9 and the broken away corner section of the container in FIG. 6, the base 6n has been rearranged with respect to the container of FIGS. 1 to 5 to dispose the frame 17n underneath the floor member 12n whereby the usually wooden frame is not exposed within the lading receiving space of the container. The side wall 7n, similar in construction to the above described side wall 7, has its lower end portion formed around the frame 17n and also the floor member 12n. A plurality of screws 24 tie the various components of the base together, including four tie or subfloor runners 25. The various components of the base are preferably bonded together with an adhesive in addition to any fasteners used. The side wall 7n is joined to member 12n by staples 10 and preferably, since the wall 7n is metal clad, by an efficient metal to wood adhesive, such as one based on an epoxy resin. As shown in FIG. 9, the metal cladding 14n of the floor member 12n is extended as a flange portion 65 slightly above the level of the floor along the inner skin 37n of the side wall and cemented thereto with, e.g., epoxy-type adhesive. The container is thus made more serviceable and leakproof with respect to liquids. To keep the flange portion within the desired inner periphery of the side wall 7n, the mandrel on which the container 5n is formed is relieved along its end portion to which the base 6n is attached to accommodate the up-turned flange portion 65 of the metal cladding 14n during the wrapping procedure.

FIG. 6 shows the container 5n suspended on a cable 67 extending in a U-shape pattern around the bottom of the container and connecting with hooks of a bar spreader 68. To facilitate "bottom-up" unloading of the container, opposite side walls of the container have attached thereto cable guides 70 at as many elevations as desired so that the cable may be inserted at the guide of proper location depending on the height of the center of gravity of the load carried in the container, to effect unloading as shown in FIG. 7. As described in respect to an earlier embodiment, container 5n is equipped with a fixture 71 providing a loop 72 attached to a lower dihedral corner of the cotnainer to which may be attached a draw cable 73 for tilting the container.

The cable guide 70 may consist in one desired form as a stamping with spaced, oppositely-pointing, longitudinally-coextensive hooks 74 and 75 pressed out of a base portion 76 to effect split-eye construction. The guides 70 are secured to the outer surface of the side wall by rivets in the manner shown or other means or spot welding to an outer metallic skin.

FIG. 10 is a plan view of a modified container base.

FIG. 11 is a fragmentary view in longitudinal cross section of the container base of FIG. 10 and a wrapping mandrel.

FIG. 12 is a fragmentary view in longitudinal cross section showing extensions of the base of FIGS. 10 and 11 in place within a side wall of the container.

Another embodiment of the invention directed to increasing the strength and tightness with which the base is connected to the side wall is illustrated by FIGS. 10 to 12. FIG. 10 shows in plan view a base 6s similar to the one shown in FIG. 2 except that the top sheet element 14s has flanges or tabs 65s which project beyond the periphery of the underlying floor material 15 having its periphery at 27s. When applied to the mandrel 30, the relationship of the base 6s with the mandrel before the side wall is formed is approximately that as shown in FIG. 11. That is to say, the flanges 65s protrude beyond the periphery of the mandrel and the frame 17s. As wrapping of the side wall 7 proceeds the flanges 65s may be folded over the adjacent portion of the side wall material at almost any stage of wrapping. However, as shown in FIG. 12, the flanges 65s are folded into face-to-face engagement with the surface of the inner skin 37 which faces inwardly of the wall 7. This is preferably done in an early phase of the formation of the side wall, i.e., during or at the completion of the wrapping of the inner skin 37 before the core material is laid onto the inner skin.

The placing of the flanges 65s against the inner skin is accompanied by the application of a strong metal-to-metal adhesive at the interfaces of metallic elements as well as those of elements with metallic elements.

FIG. 13 illustrates a side wall 7w of modified construction. Its structure is perhaps best understood by a description of its mode of manufacture. In its simplest form, the wall comprises a continuous sheet 40w extending, as the wrapping procedure is completed, from the innermost surface of the wall to the outermost surface. The wall further comprises separate sheets which may be of the same material or different materials which are placed on the wall 7w at a proper stage of wrapping to form an inner skin 37w and an outer skin 38w. The most important reason that the core material sheet 40w extends from the innermost part of the wall to the outermost part and initially covers the inner skin and the outer skin is that it functions during wrapping as a medium for shaping the inner skin and the outer skin to the wall contour. Because of the substantial tension maintained between the supply roll 78 (see FIG. 17) and the mandrel 30, the skin forming sheet 79 need not be supplied to the mandrel under tension and may actually be introduced into the bite between the sheet 40w and the mandrel by hand when sheets of skin material are of such size as to be conveniently manually handled.

Usually, but not necessarily, those portions of the core material sheet 40w covering both skins along the extreme inner and outer surfaces of the wall are applied without adhesive and are removed to expose respective skin surfaces. That is to say, a portion of the sheet 40w extending from point 81 by which it is secured to the mandrel to approximately a point 82 is not covered with adhesive. A portion of the sheet 40w on the outer skin extending from point 83 to its trailing extremity 84, is also not covered with adhesive in order that those portions of the sheet will be non-adherent with respect to the skins and be easily torn away to provide the wall with outer and inner metallic surfaces.

An important aspect of manufacturing the side wall 7w in FIG. 13 under present technological conditions is that, in order to utilize the currently inexpensive urea or phenol formaldehyde adhesives in adhering adjacent wraps of the core material sheet 40w, it is necessary to recognize that these adhesives are not ideal for adhering a paper or paper-like core material to skins comprising a metal. Hence, the faces 85 and 86 of the skins 37w and 38w, respectively, which face inwardly of the wall toward the main body of the core material are formed prior to the wrapping procedure by a facing material such as a lamina of paper adhered by epoxy or polyester adhesive to the surface of the metallic sheet facing the core material. For example, in FIG. 14 a small section of the inner skin 37w is shown greatly enlarged. Prior to wrapping, the metallic sheet 87 is covered by a facing material 88, such as paper, adhered to the metallic sheet by an adhesive 89. Hence, when the face of skin 37w is fed into the wrapping operation, the surface of the facing sheet 88 may be coated with a relatively inexpensive adhesive, such as used in bonding adjacent wraps of the core material to adhere the facing material 88 and the attached metallic sheet 87 to an adjacent wrap of the core material.

FIG. 15 illustrates another side wall of modified construction particularly adapted for use of wooden veneer pieces 91 which are relatively thick, lightweight and porous as compared with the continuous sheet of skin material 92. The purpose of the pieces 91 is to space the successive wraps of the continuous sheet 92 in order to establish thickness of the wall and thus develop beam strength of stiffness therein. The relation of pieces 91 to the endless direction of the wall is such that the separation lines of abutting edges of the pieces do not occur in superimposition with similar lines of separation in the next adjacent laminations of core material or pieces 91. Ideal for this purpose are the pieces 91 of L-shape cross section shown, whereby a leading edge of one piece is disposed adjacent a corner of the wall and extends around the next occurring corner of the wall to terminate in a trailing edge. In the next adjacent lamina of pieces 91, the long and the short legs of the L-shaped pieces are reversed in direction in order to disposed the adjacent abutting ends of the pieces out of superimposition with the abutting ends of the next adjacent lamina of core material, as shown in FIG. 15. For example, wrapping of the first lamina of core material would begin with its leading edge 93 and terminate in a trailing edge 94. Wrapping the next lamina of core material is commenced at a point which peripherally spaces the leading edge 95 of the second lamina from the leading edge 93 of the first lamina. This also causes sections 96 and 97 of the continuous sheet 92 to be superimposed without core material therebetween and adhered together by the adhesive used to unite all elements of the wall 7x.

The second lamina is completed in a trailing edge 98 adjacent the leading edge at 95. As described with respect to the first lamina of core material, the sheet 92 extends between the termini of the second lamina of core material to form the next successive wrap of the skin material which extends uniformly throughout the thickness of the wall 7x.

The third lamina commences with its leading edge disposed in the direction of wrapping at a point 99 peripherally spaced from the leading edge 95 of the second lamina. In this manner, many wraps of the core material and skin material may be constructed to build the complete wall to any thickness desired with substantial dispersal of abutment gaps of the pieces of plywood forming the various laminae. The continuous sheet may be constituted of paper, films or sheets of synthetic resin, metallic foils or sheets and other flexible materials capable of forming continuous sheets.

The pieces 91 may be constituted from an addition to wood veneer of any other similarly inexpensive material having flexibility sufficient to be bent around corners required in the wall 7x.

During the wall forming wrapping procedure, the sheet 92 may be coated on both sides with adhesive, with the exception of the outer and inner skin forming sections thereof which are coated only on the side facing the adjacent lamina of core-forming pieces 91.

FIGS. 16 and 17 illustrate machinery which is conventional in wrapping techniques, except for the use and arrangement of mandrel 30 with the spindle 33, and the container to be constructed thereon. As suggested before, in practicing this invention, it is necessary to fasten the container base to the end of the cantilever-supported mandrel 30 so that the periphery of that portion of the base in abutment with the end surface of the mandrel coincides with the periphery of the mandrel.

As each of the types of containers described above comprises a continuous sheet used to constantly maintain a bite between the sheet and the mandrel for receiving any other component of which the side walls are composed, the continuous sheet is fastened either to the base, the mandrel, or both and wrapping proceeds intermittently or continuously, as the nature of the non-continuous components of the wall permit, to assemble the side wall and base of the container as indicated in the description above of the varous types of containers.

FIGURE 17 includes supply rolls 103 and 104 of, e.g., paper, for supplying alternatively the facing material required by the skins 37w and 38w of FIGURE 13. It will be understood that the adhesive doctor blade and roll applying devices indicated at 106, 107, 108, and 109 may be moved or otherwise made inoperative as the occasion demands at the will of the operator to achieve application of adhesive to one or the other side of the respective sheets passing thereby.

When the wrapping is completed, the container may be retained on the mandrel, and the assembly of the mandrel and the container removed from the arbor 33 by withdrawal or unfastening of such fastening means (bolts 34 shown) to permit detachment of the assembly from the arbor. Thereafter, the wall, while mounted on the mandrel, is subjected to a curing operation which necessarily includes the application of pressure to press the elements of the side wall supported by the mandrel in tightly compacted relationship and, under usual production condition, includes the application of heat.

FIGURE 20 illustrates schematically apparatus including platens 111, 112, 113, and 114 adapted for applying both heat and pressure to a four-sided container. The apparatus 115 of FIGURE 18 shows schematically simply a press which preferably includes platens which are preferably heated for shaping and curing the plywood angles 36 of which one is shown in perspective in FIG. 19. This latter figure illustrates plywood core components of the type described with respect to FIG. 3.

The terms and expressions which have been employed are used as terms of description and not of limitations, and there is no intention of excluding such equivalents of the invention described or of the portions thereof as fall within the scope of the claims.

What is claimed is:
1. A container adapted for a method of manufacturing including a wrapping operation comprising a base and a continuous side wall; the base comprising:
 a circuitous frame having a central opening and an outer periphery matching the inner periphery of one end of the side wall, said frame disposed within said end;
 flooring material attached to one side of said frame and covering said opening to form a planate floor facing along the length of said wall;
 the side wall having skin structure comprising outer and inner skins, and core structure disposed between said skins; said wall comprising two types of sheet material forming both structures as superimposed wraps within said side wall and each of said sheet materials primarily constituting one of said structures;
 one of said sheet materials being a substantially continuous sheet and extending as a series of wraps from the inner periphery of the wall to the outer periphery to form one of said structures, the other sheet material comprising a plurality of pieces disposed between selected successive wraps of said continuous sheet to form the other of said structures; and
 adhesive composition disposed along substantially all interfacial surfaces of the aforenamed components of the container; and
 fastening means extending through the side wall into the base to secure the wall and the base together.

2. The container of claim 1 wherein:
 said base comprises parallel spaced stringers attached to the underside of said floor and frame to separate them from a supporting surface for the container for entry therebetween of lifting equipment.

3. The container of claim 1 wherein:
 said floor is disposed outside said side wall in abutting relation with an end surface of said wall.

4. The container of claim 1 wherein:
 said skins comprise sheet metal and said floor material includes a layer of sheet metal defining the face of the floor facing along the length of the side wall; and
 said metallic layer has tabs extending from said face in adhesively-joined relation with one of said materials and parallel relation with said length of the wall.

5. The container of claim 4 wherein said tabs are disposed between said inner skin and the core material.

6. The container of claim 1 wherein said frame and said floor are both disposed within said end of the side wall and the base comprises spaced parallel stringers in approximate abutting relation with an end surface of the side wall and said frame.

7. The container of claim 1 adapted for load-removal by up-ending comprising:
 hoist connecting means attached to opposite sides of the side wall in substantially spaced relation with the base; and
 loop means attached to the container adjacent a lower dihedral corner extending transversely relative to and between said opposite sides.

8. The container of claim 1 wherein said skin structure is a continuous metallic sheet forming both skins, and said core structure comprises a relatively thick lamina separating the skins except for a small longitudinal gap in said lamina accommodating extension therethrough of a short section of said continuous metallic sheet connecting said skins.

9. The container of claim 1 wherein:
 said core structure comprises a single continuous sheet wound into sufficient wraps to provide a wall core of a desired thickness; and
 said outer and inner skins are separated sheets and said skins are covered by the outermost and innermost wraps, respectively, of said continuous sheet.

10. The container of claim 9 wherein:

said outermost and innermost wraps are in non-adherent relation with the external surfaces of the outer and inner skins, respectively, and are thus removable.

11. The container of claim 1 having polygonal side walls wherein:

said skin structure comprises a single continuous sheet; and said core structure comprises consecutive L-shaped panels of plywood extending partly along one flat portion of said side wall, around a corner of the wall and over a smaller section of the adjacent flat portion of the side wall, said panels having one leg of greater length than the other;

said wall is formed of a plurality of laminae of said L-shaped panels each separated by a wrap of said continuous sheet; and said panels are arranged to dispose the longer leg in leading relation to the shorter leg in one lamina and the shorter leg leading the longer leg in the next adjacent lamina to thereby dispose the separation joints between adjacent panels at different points about the periphery of the side wall.

12. A container comprising a base and a continuous side wall in which the base comprises:

a circuitous frame having an outer periphery matching the inner periphery of said side wall, and disposed within an end thereof;

flooring material attached to the side of the frame facing outwardly from said end to form a planate floor;

said frame having an inner periphery defining an opening substantially exposing the surface of the floor facing inwardly of the side wall, and the side wall comprises:

outer and inner skin wraps and a core wrap sandwiched therebetween, said core wrap having a leading end and a trailing end spaced to form a small gap, said skin wraps comprising one continuous length of sheet material extending as a complete inner wrap overlapping its leading end, through said gap, and in a complete wraparound the outer periphery of the core wrap to overlap itself and terminate in a trailing end portion;

an adhesive composition disposed along substantially all interfacial surfaces of overlapping portions of the skin wraps, and of the core wrap and the skin wraps; and the container further comprises:

fastening means extending through the side wall into said frame to secure the base and the side wall together.

13. The container of claim 12 wherein:

said trailing end and leading end portions are disposed over portions of the core wrap at opposite sides of said gap; and fastening means extends through both of said end portions and adjacent underlying material of the side wall to secure the side wall as a continuous structure.

14. The container of claim 12 comprising spaced parallel stringers secured to the side of the floor facing away from the adjacent end of the side wall.

15. The container of claim 12 comprising a metallic sheet covering a side of the floor facing inwardly of the side wall with a peripheral edge portion secured between said frame and the floor.

References Cited

UNITED STATES PATENTS

| | | | |
|---|---|---|---|
| 485,158 | 8/1892 | Cwerdinski | 217—1 |
| 1,997,344 | 4/1935 | Randall et al. | 217—17 |
| 2,474,968 | 7/1949 | Beach | 206—46 |
| 2,699,417 | 1/1955 | Repsher et al. | 161—220 |
| 2,884,125 | 4/1959 | Cadillac et al. | 217—43 |
| 3,216,457 | 11/1965 | Zavasnik | 156—190 |
| 250,779 | 12/1881 | Brown | 294—73 |

RAPHAEL H. SCHWARTZ, *Primary Examiner.*